United States Patent [19]

McBroom

[11] Patent Number: 5,785,244

[45] Date of Patent: Jul. 28, 1998

[54] METHOD AND SYSTEM FOR AUTOMATICALLY CONTROLLING AN AUTOMOTIVE HVAC UNIT

[75] Inventor: Mark D. McBroom, Redford, Mich.

[73] Assignee: Ford Motor Company, Dearborn, Mich.

[21] Appl. No.: 876,416

[22] Filed: Jun. 16, 1997

[51] Int. Cl.$^6$ .................... H02P 1/54; F24F 7/00
[52] U.S. Cl. .................... 236/49.3; 62/179; 137/624.2; 165/43; 318/51
[58] Field of Search .................... 62/179, 186; 454/75; 165/43; 318/51; 137/624.2; 236/49.3

[56] References Cited

U.S. PATENT DOCUMENTS

| | | | |
|---|---|---|---|
| 4,858,677 | 8/1989 | Doi et al. | 165/43 X |
| 4,922,171 | 5/1990 | Ohi | 318/471 |
| 4,930,567 | 6/1990 | Akabane et al. | 165/25 |
| 5,136,222 | 8/1992 | Yamamoto et al. | 318/51 X |
| 5,369,342 | 11/1994 | Rudzewicz et al. | 318/102 |
| 5,440,486 | 8/1995 | Rudzewicz et al. | 364/424.05 |
| 5,549,152 | 8/1996 | Davis, Jr. et al. | 165/201 |
| 5,582,234 | 12/1996 | Samukawa et al. | 165/204 |
| 5,687,790 | 11/1997 | Trame et al. | 165/43 X |

*Primary Examiner*—William E. Wayner
*Attorney, Agent, or Firm*—Raymond L. Coppiellie; Roger L. May

[57] ABSTRACT

A method and system for automatically controlling a heating, ventilating, and air conditioning (HVAC) unit of a vehicle includes multiple electric motors for actuating multiple respective doors directing air flow through the HVAC unit and temperature of the air flow. A plurality of sensors sense a plurality of temperatures. A controller determines a desired temperature and desired direction of air flow based on the plurality of temperatures. The controller also controls the multiple electric motors so that their respective doors move at the same time while preventing preselected doors from operating at the same time based on the desired temperature and desired direction of air flow.

17 Claims, 9 Drawing Sheets

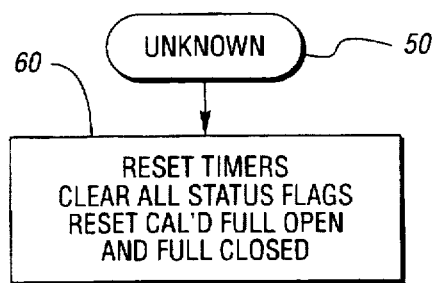
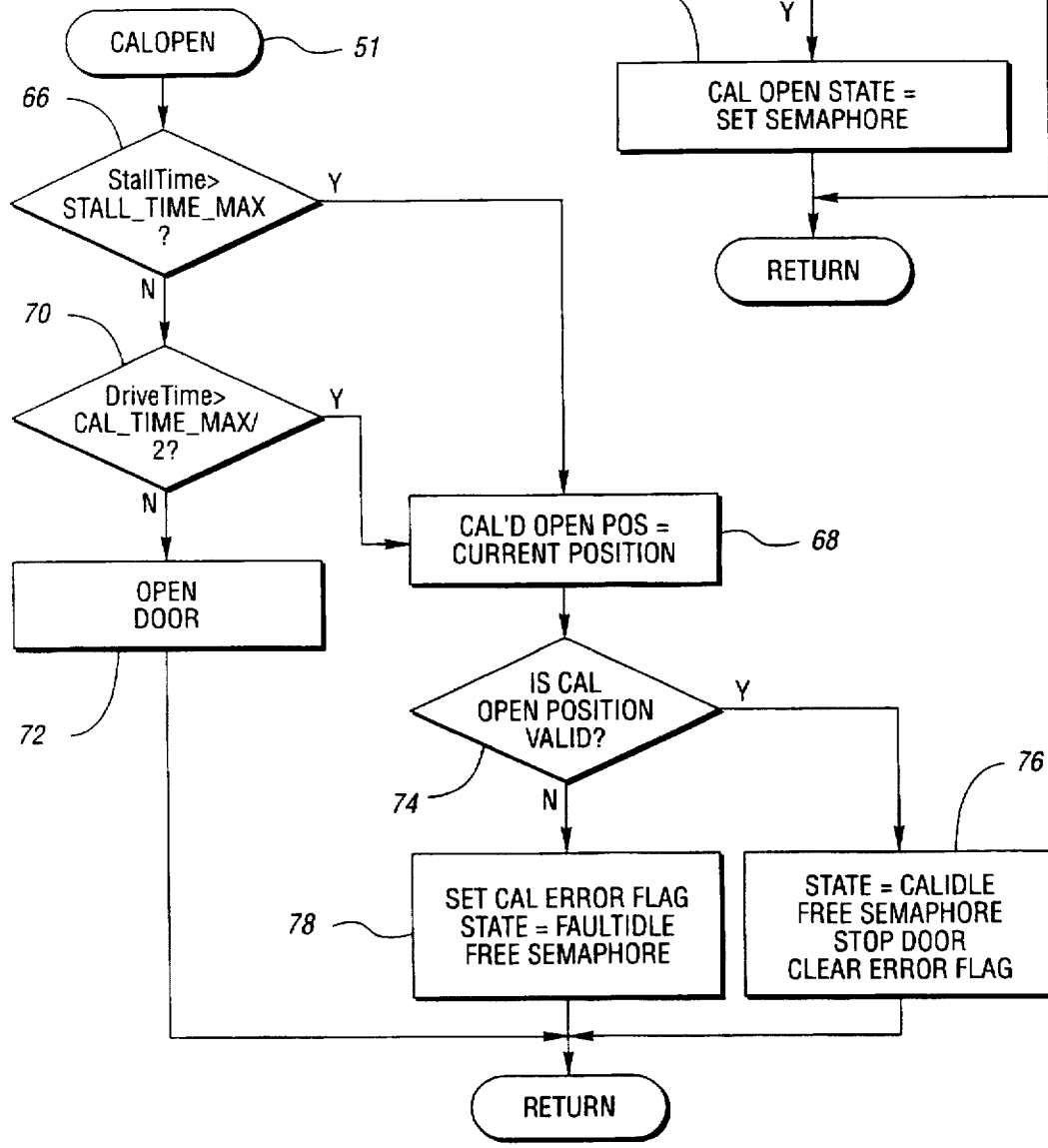

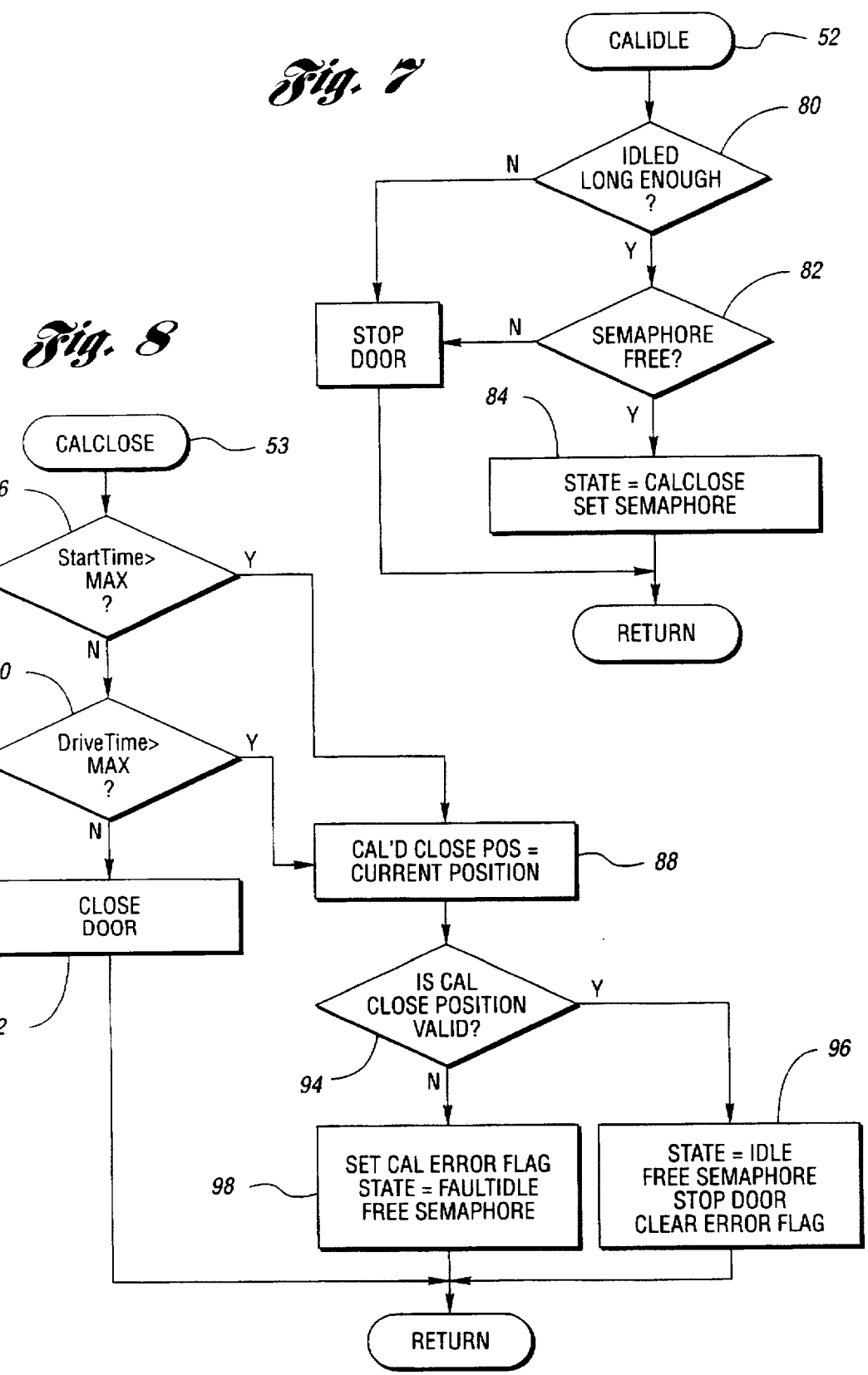

METHOD AND SYSTEM FOR AUTOMATICALLY CONTROLLING AN AUTOMOTIVE HVAC UNIT

TECHNICAL FIELD

This invention relates to methods and systems for automatically controlling an automotive heating, ventilation and air/conditioning (HVAC) unit having multiple electric motors.

BACKGROUND ART

In an automobile having an automatic temperature control (ATC) system, electric motor systems can be used to control doors of HVAC units. The ATC system uses a control algorithm to calculate a desired position for the motor. The motor control software then moves the motor in the correct direction and constantly monitors a motor analog feedback signal voltage until the feedback voltage value corresponds to the calculated desired position.

The electric motors are typically controlled serially. That is, only one motor is actuated at a time. It may be desirable, however, to control several motors simultaneously in order to reach the desired temperature, or comfort, of the automobile quicker and to eliminate or minimize abrupt transitions between door positions. In this situation, however, it may also be desirable to exclude movement of preselected doors so that certain doors do not interfere with each other.

DISCLOSURE OF THE INVENTION

It is thus a general object of the present invention to provide a method and system for automatically controlling multiple electric motors in an HVAC unit so that their respective doors move at the same time while also preventing preselected doors from operating at the same time.

In carrying out the above object and other objects, features, and advantages of the present invention, a method is provided for automatically controlling an automotive HVAC unit having multiple electric motors. The method includes the steps of sensing a plurality of temperatures and determining a desired temperature and desired direction of air flow based on the plurality of temperatures. The method also includes the step of controlling the multiple electric motors so that their respective doors move at the same time while preventing preselected doors from operating at the same time based on the desired temperature and desired direction of air flow.

In further carrying out the above object and other objects, features, and advantages of the present invention, a system is also provided for carrying out the steps of the above described method. The system includes a plurality of sensors for sensing a plurality of temperatures. The system also includes a controller for determining a desired temperature and desired direction of air flow based on the plurality of temperatures. The controller is also operative to control the multiple electric motors so that their respective doors move at the same time while preventing preselected doors from operating at the same time based on the desired temperature and desired direction of air flow The above object and other objects, features and advantages of the present invention are readily apparent from the following detailed description of the best mode for carrying out the invention when taken in connection with the accompanying drawings.

BRIEF DESCRIPTION OF THE DRAWINGS

FIGS. 5–14 are flow diagrams illustrating the general sequence of steps associated with the operation of each of the states illustrated in FIG. 4.

BEST MODES FOR CARRYING OUT THE INVENTION

Figure 1:
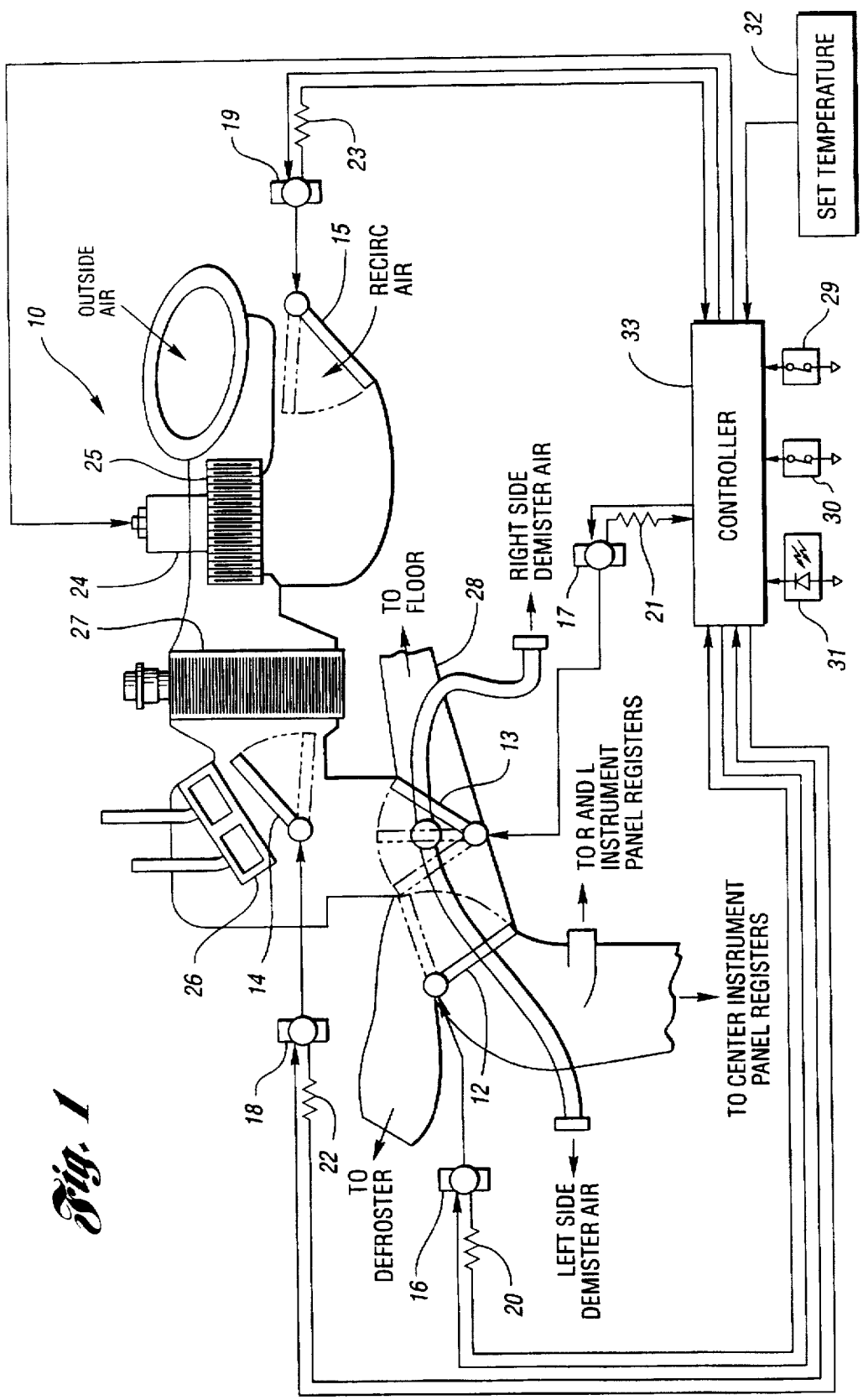
FIG. 1 is a schematic diagram illustrating an air handling system which can be controlled by the method and control system of the present invention.
Figure 2:
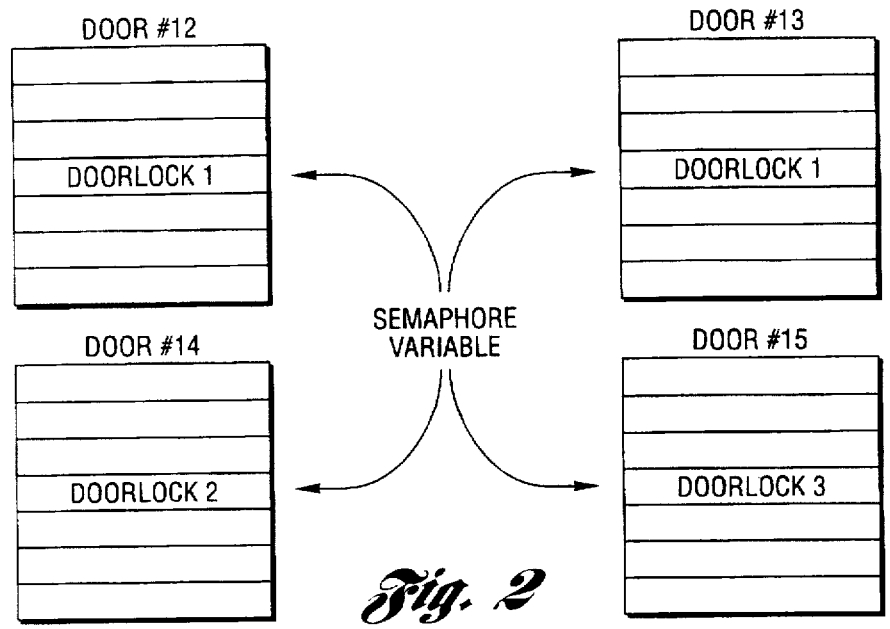
FIG. 2 is illustrates a data structure associated with each door to be controlled by the method and system of the present invention.

In general, control of temperature within an automobile is accomplished using various actuators to adjust the temperature and flow of air supplied to the cabin of the vehicle. FIG. 1 shows schematically an air handling system of an HVAC (heating, ventilation and air conditioning) unit, generally indicated at 10. The system 10 includes the arrangement of panel-defrost, floor-panel, temperature blend and outside recirc air actuators or doors 12, 13, 14 and 15, respectively. The doors 12–15 are driven by electric motors 16, 17, 18 and 19, respectively, between their various positions, as indicated in FIG. 1. Motors 16–19 each include a feedback potentiometer 20, 21, 22, and 23, respectively, to provide a feedback signal representative of the position of their respective doors.

The system 10 also includes a variable speed blower motor or fan 24 including a blower wheel 25.

The system 10 further includes heating and cooling elements such as a heater core 26 and an evaporator core 27 in a typical vehicle air conditioning plant. Each of the above components is in communication with ducting 28 in order to control temperature, the direction of air flow and the ratio of fresh air to recirculated air.

For automatic control of the temperature and flow of air in the cabin, conditions within and outside the cabin are monitored by an ambient temperature sensor 29, an in-car temperature sensor 30, and a sunload sensor 31. A desired comfort setting, or set temperature 32, is set by the occupant of the vehicle, either by a rotary knob or a push-button, or any other similar device.

An electronic controller 33 generates signals to control motors 16–19 according to the conditions as indicated by the sensors 29–31 and by set temperature 32 to regulate the temperature and flow of air and ultimately to maintain the comfort of the driver and passengers in the vehicle. Each of the motors 16–19 can be actuated simultaneously by controller 33, which is desirable in reaching the desired comfort level quicker and in minimizing abrupt transitions between the various door positions.

Figure 3:
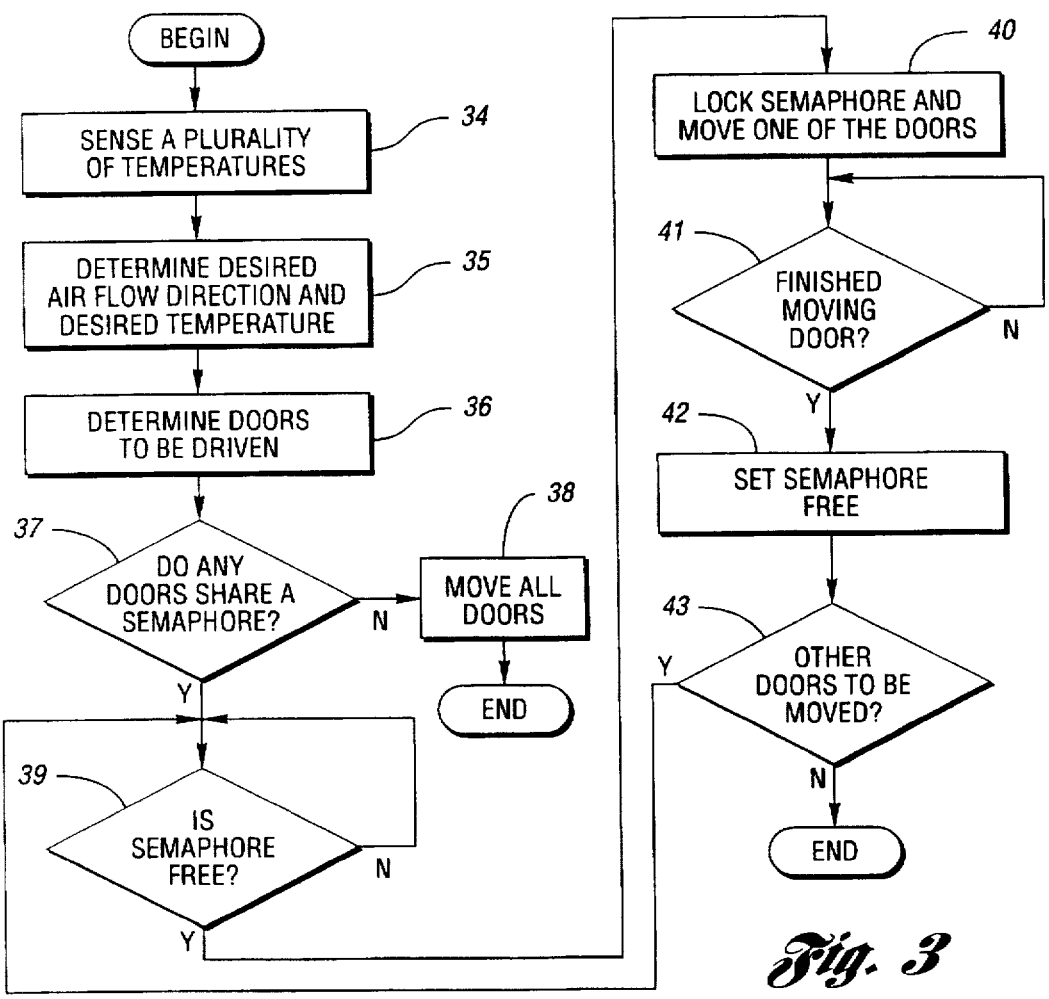
FIG. 3 is a flow diagram illustrating the general sequence of steps associated with the method of the present invention.

However, it is also desirable to restrict or prevent the movement of a selected door(s) because it/they may interfere with the movement of another door(s) (e.g., doors 12 and 13) or draw too much current. This exclusion can be achieved utilizing a semaphore. A semaphore is a hardware or software flag used to indicate the status of some activity so that access to shared system resources is governed. FIG. 3 illustrates the semaphore variable included in the data structure of each door. Each door that must be mutually excluded, e.g., doors #12 and #13, share the same semaphore, e.g., DoorLock1. If the semaphore variable is some value, e.g., 0, then door #12 or #13 may be moved because neither one is presently being moved since the semaphore set free. However, if the semaphore variable is another value, e.g., 1, then one of the doors is being moved so the other door cannot be moved yet. That is, if door #12 is being moved, its semaphore variable is set to 1, or locked. Then when the semaphore variable for door #13 is checked, it is found to be set to 1, therefore, door #13 cannot be moved at this time. Thus, the mutually exclusive doors are linked together via the semaphore.

Turning now to FIG. 3, there is shown a flow diagram illustrating the general sequence of steps associated with the method of the present invention. Beginning at block 34, a plurality of temperatures are sensed, including in-car temperature, sunload, ambient air, and set temperature. The controller 33 then determines the desired direction of air flow and desired temperature based on these signals, as shown at block 35.

Next, the doors that need to be driven to achieve the desired air flow direction and desired temperature are determined, as shown at block 36. A check is made to determine if any of the doors share the same semaphore variable, as shown at conditional block 37. If not, all the doors are moved accordingly, block 38.

If a semaphore is share between any of the doors, the semaphore variable is checked to determine if it is free, or unlocked, as shown at conditional block 39. If not, the method proceeds to keep checking until the semaphore is freed for any of the doors.

If the semaphore is free for one of the doors, the semaphore is locked and one of the doors is moved, as shown at block 40. Once the door is finished being driven, based on the feedback signal generated by the respective motor, the semaphore is set free, as shown at conditional block 41 and block 42.

The method proceeds to determine if there are any other doors remaining that need to be moved, as shown at conditional block 43. If not, the routine is exited. If so, the method proceeds to return to conditional block 39 to determine if the semaphore is free.

Figure 4:
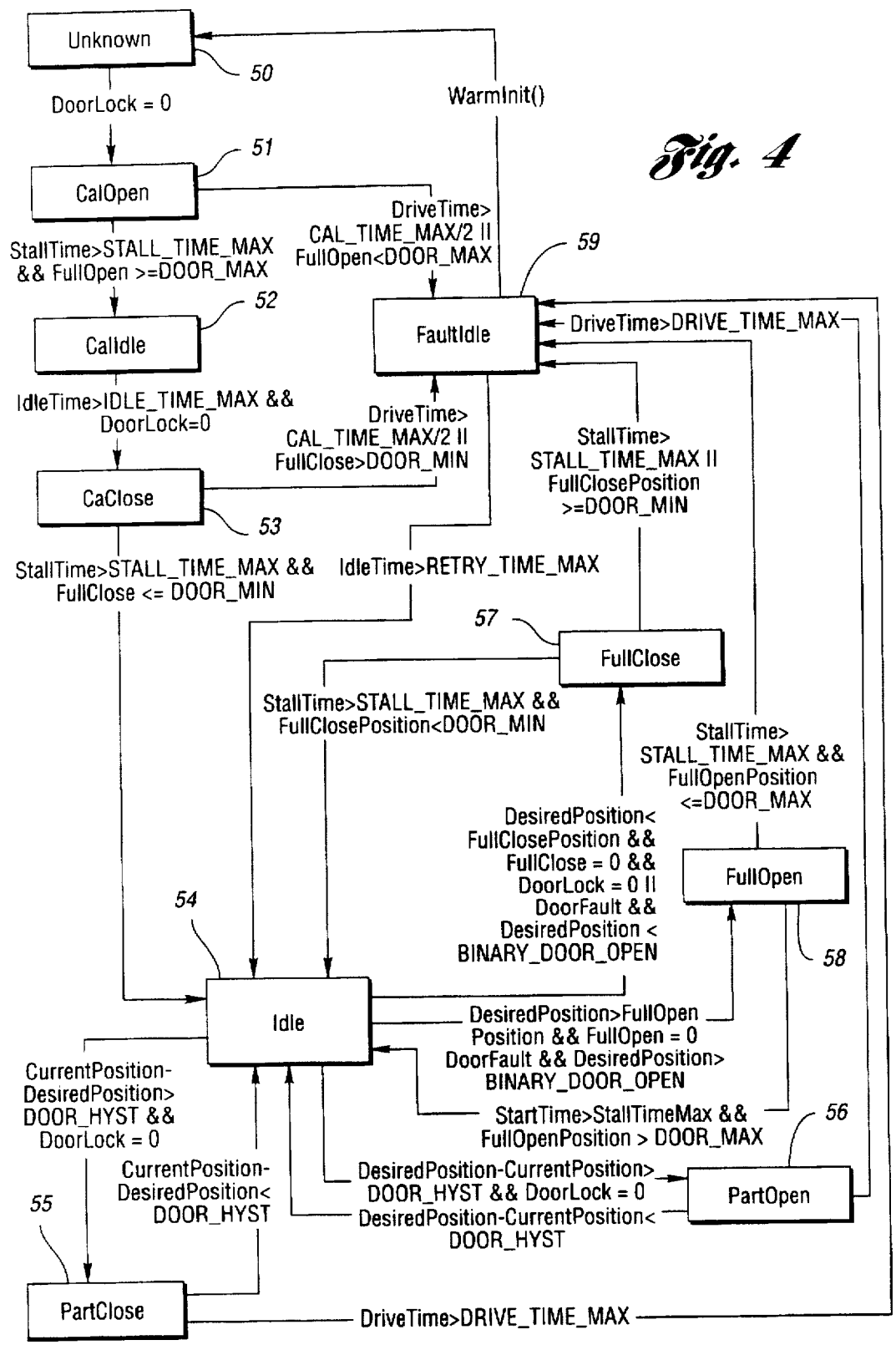
FIG. 4 is a state-transition diagram of operations of the ATC motor control system of the present invention.

The sequence of transition states used to step through various operations required to operate motors 16–19 is shown in FIG. 4. Although only one state transition diagram is shown in FIG. 4, a similar state transition diagram exists for each door to be controlled. Blocks 50–59 designate the internal states and arcs, with arrow heads attached thereto and connected between blocks, depict input/output conditions that cause transition between states.

Unknown state 50 is entered upon power-up of the vehicle. At this time, initialization of each door takes place, including resetting timers and clearing all status flags, as well as calibration, as shown at block 60 in FIG. 5. In addition, the previously calculated full open and full closed positions are reset. Before calibrating the door, controller 33 determines if the semaphore for this door, i.e., DoorLock, is zero, as shown at conditional block 62, indicating the door is free to move. If not, controller 33 returns to the Unknown state 50.

If the semaphore is free, controller 33 enters CalOpen state 51, and sets the semaphore, DoorLock, as shown at block 64. The semaphore is set to 1 so that any other doors associated with this semaphore cannot be actuated simultaneously.

Transition from Unknown state 50 to the CalOpen state 51 is shown in FIG. 6. The CalOpen state 51 calibrates the door to determine its full open position. First, a determination is made as to whether or not the time the door has been driving without a change in the feedback signal, i.e., StallTime, exceeds a maximum stall time, STALL_TIME_MAX, indicating that end of travel of the door has been reached, as shown at conditional block 66. If so, the current position is used as the calibrated open position, as shown at block 68.

If StallTime does not exceed the maximum stall time, the method proceeds to determine if the amount of time the door has been driving towards the desired position, DriveTime, exceeds a maximum calibration time, CAL_TIME_MAX/ 2, as shown at conditional block 70. If so, the calibrated open position is set equal to the current position, as shown at block 68. Otherwise, the door continues to be driven open, as shown at block 72 and remains in the CalOpen state 51.

Returning to block 68, once the calibrated open position is determined, the method proceeds to determine if the calibrated open position is valid, as shown at conditional block 74. This determination is made by comparing the calibrated open position with a predetermined value, DOOR_MAX. If the calibrated open position is greater than the DOOR_MAX, the value is valid and a transition is made to the CalIdle state 52, as shown at block 76. Otherwise, there is a calibration error, and a transition is made to the FaultIdle state 59, as shown at block 78, which will be described more fully below. In both cases, however, the semaphore is freed so that any other doors associated with that semaphore can be actuated.

Turning now to FIG. 7, there is shown a flow diagram illustrating the operation of the CalIdle state 52. The method remains in the CalIdle state if the idle time is below a predetermined threshold, $IDLE_{13} TIME\_MAX$, as shown at conditional block 80. If the method has idled enough, a determination is made as to whether or not the semaphore is free, as shown at conditional block 82. If not, the door cannot be moved and must remain in the CalIdle state 52. If the semaphore is free, a transition is made to the CalClose state 53, as shown at block 84, and the semaphore is set.

Upon entering the CalClose state 53, the StallTime is compared with a maximum stall time, as shown at conditional block 86. The calibrated close position is set to the current position if the maximum stall time has been exceeded, as shown at block 88. If not, the DriveTime is then compared with a maximum drive time, as shown at conditional block 90. Again, if the maximum drive time has been exceeded, the calibrated close position is set to the current position.

If the maximum drive time has not been exceeded, the method proceeds to continue to close the door, block 92, and remain in the CalClose state 53. After exceeding the maximum stall time and drive time and setting the calibrated close position to the current position, the method proceeds to determine if the calibrated close position is valid, as shown at conditional block 94. This determination is made by comparing the calibrated close position with a minimum value. If the calibrated close position is less than or equal to the minimum value, DOOR_MIN, then the position is valid, and a transition is made to the Idle state 54, as shown at block 96. If the position is not valid, then a transition is made to the FaultIdle state 59, as shown at block 98, and the Calibrated Error Flag is set. In both cases, the semaphore is freed.

Figure 9:
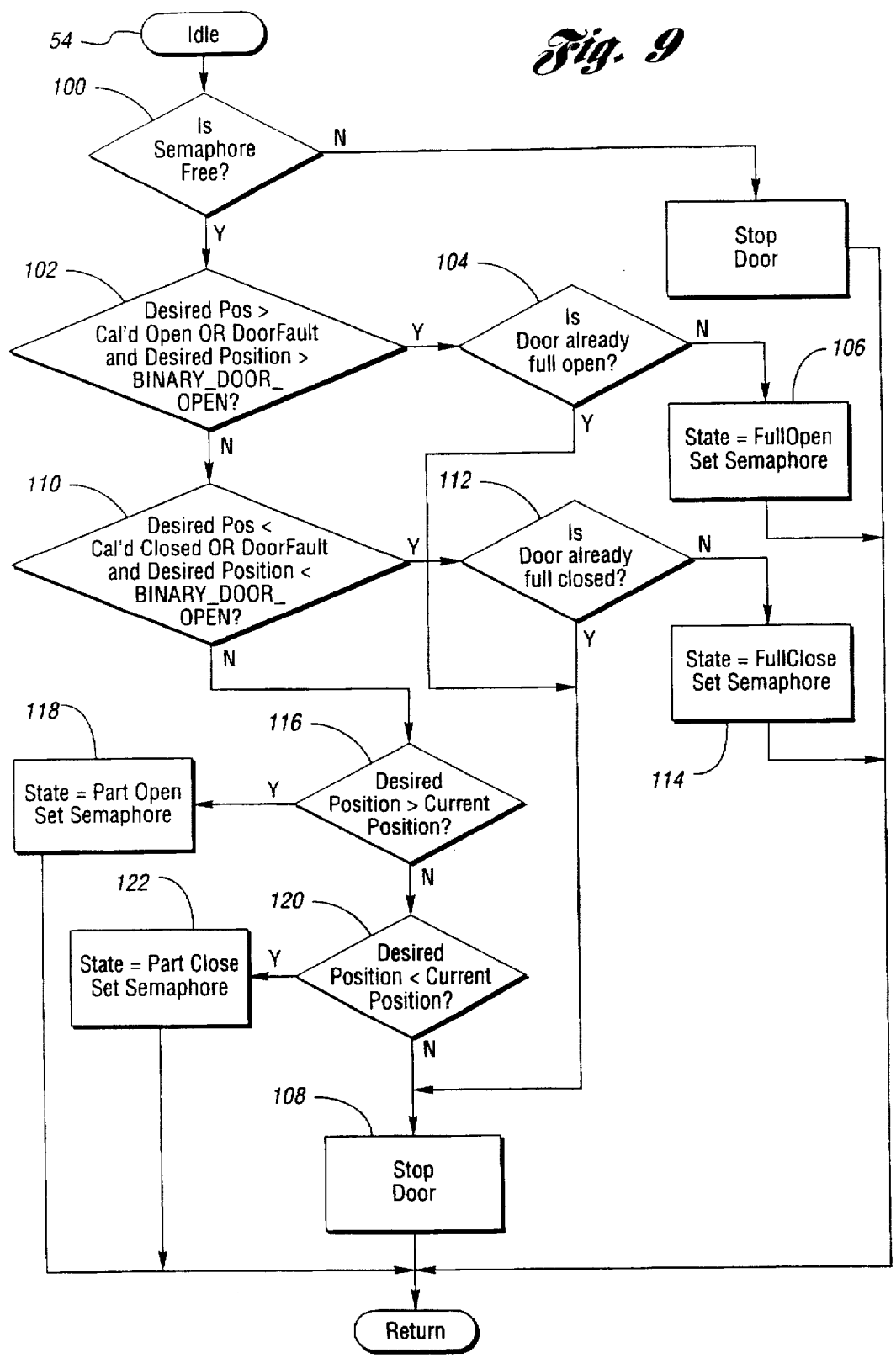

The flow diagram associated with the Idle state 54 is illustrated in FIG. 9. If the semaphore is not free, movement of the door, if any, is stopped and the door remains in the Idle state 54, as shown at conditional block 100. Once the semaphore becomes free, the desired position of the door is determined by controller 44. As shown at conditional block 102, if the desired position is greater than the calibrated open position or if an error is present (i.e., Door Fault), and the desired position is greater than a switch point value, BINARY_DOOROPEN, the method proceeds to determine if the door is already fully opened according to a Full Open flag described below, as shown at conditional block 104. If an error is present, or currently flagged, a switch point is used to determine if the door should be opened fully or closed fully since the exact position of the door may not be known. If the desired position of the door exceeds the previously mentioned values and the door is not fully opened, a transition is made to the FullOpen state 58 and the semaphore is set, as shown at block 106, which will be described in greater detail below.

If the door is already fully opened, the door is stopped, block 108, and remains in the Idle state 54. On the other hand, if the desired position is less than the previously mentioned values, a check is made as to whether or not the door is already fully closed, as shown at conditional blocks 110 and 112. If the door is already fully closed, a transition is made to the FullClose state 57 and the semaphore is set, as shown at block 114, which will be described in greater detail below. Otherwise, the door is stopped and remains in the Idle state 54.

If conditional blocks 102 and 110 are not satisfied, then the method proceeds to determine whether the desired position of the door is greater than the current position, as shown at conditional block 116. If so, it is desirable to open the door, and a transition is made to the PartOpen state 56, as shown at block 118. Since the door will be actuated, the semaphore is set.

If the desired position is less than the current position, then it is desirable to close the door, as shown at conditional block 120. A transition is made to the PartClose state 55, as shown at block 122, and again the semaphore is set. Otherwise, the door remains in the Idle state 54.

Figure 10:
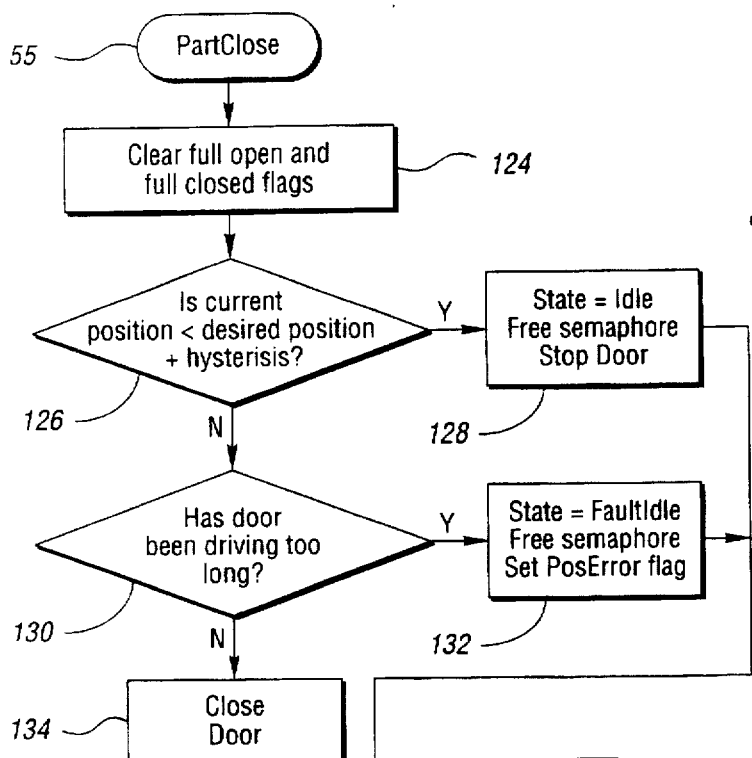

The PartClose state 55 is described in more detail in FIG. 10. First, the full open and full closed flags are cleared, as shown at block 124. Next, the current position of the door is compared with a desired position plus a hysteresis, as shown at conditional block 126. If so, then the difference between the desired position and the current position is sufficiently minimal so that the door can be stopped, as shown at block 128. At this time, the door enters the Idle state 54 and the semaphore is set free.

If the current position is greater than the desired position plus hysteresis, then the drive time is compared to the maximum drive time allowable, as shown at conditional block 130. If the maximum drive time has been exceeded, the position cannot be attained and the door is stopped and put into the FaultIdle state 59, as shown at block 132. The semaphore is set free and an error flag is set.

If the current position exceeds the desired position plus the hysteresis and the maximum drive time has not been exceeded, the door continues to be closed, as shown at block 134, and remains in the PartClose state 55.

Figure 11:
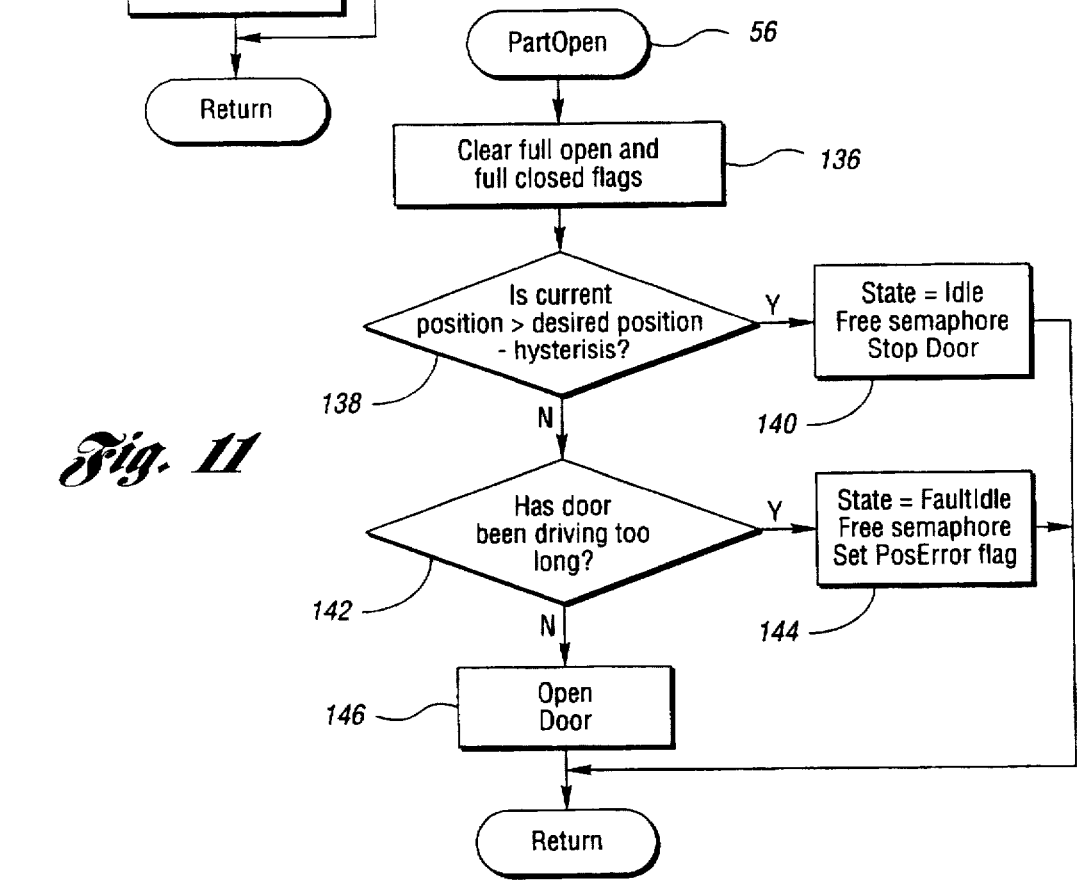

Turning now to FIG. 11, the PartOpen state 56 is illustrated and operates in a similar manner as the PartClose state 55. The full open and full closed flags are cleared, block 136, and the current position is compared with the desired position plus a hysteresis, conditional block 138. If the desired position has been reached, the door is stopped and returned to the Idle state 54, as shown at block 140.

If the desired position has not been reached and the door has been driving too long, conditional block 142, then the door enters the FaultIdle state 59 and an error flag is set, as shown at block 144. Otherwise, the door is continued to be moved and remains in the PartOpen state 56, as shown at block 146.

Figure 12:
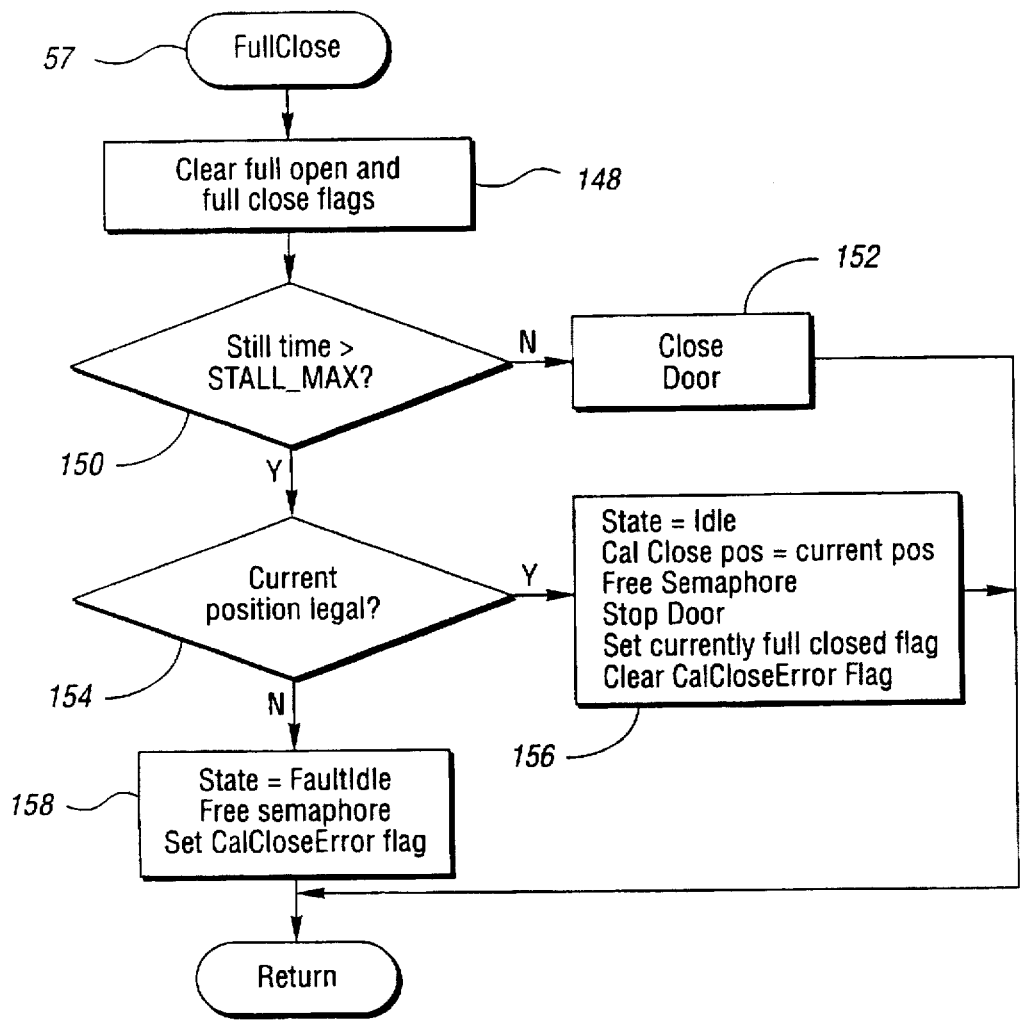
Figure 13:
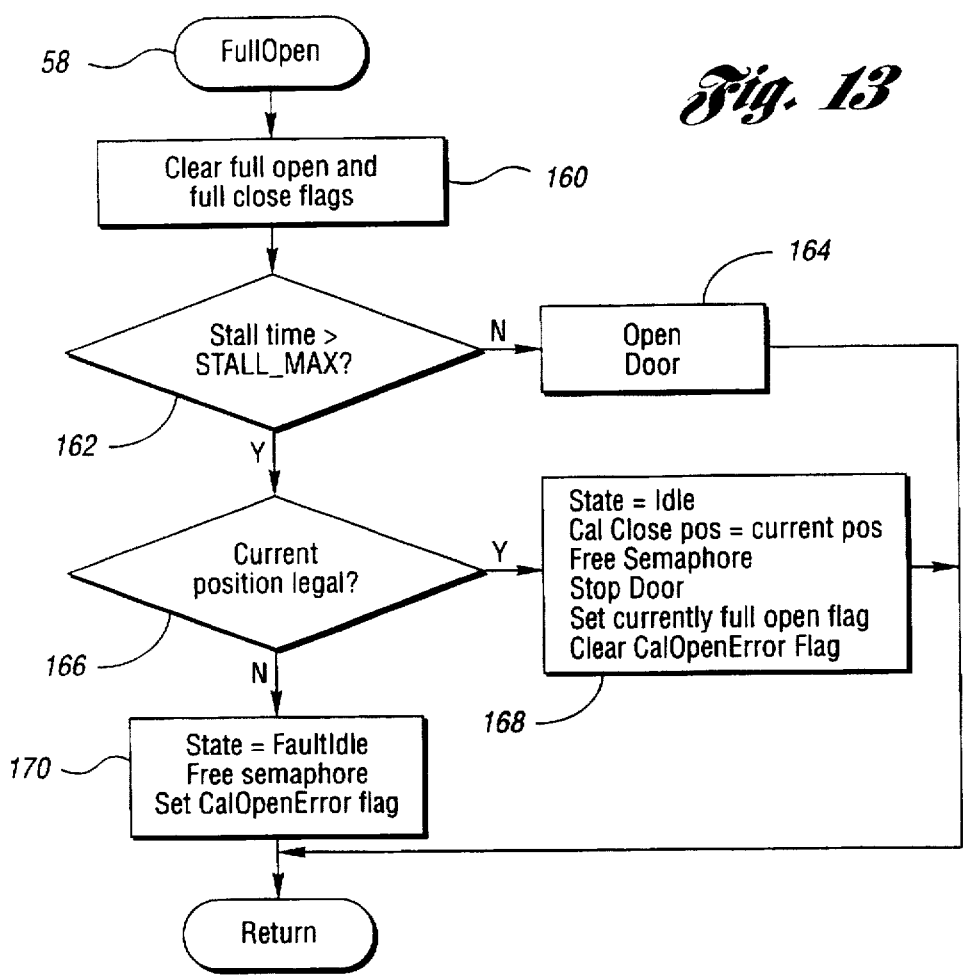

Turning now to FIGS. 12 and 13, there are shown flow diagrams illustrating the steps followed in the FullClose state 57 and the FullOpen state 58. The full open and full closed flags are cleared first, as shown at blocks 148 and 160. The stall time is compared to a maximum stall time, as shown at conditional blocks 150 and 162. If the maximum stall time has not been exceeded, the door is directed to continue to close or open, blocks 152 and 164, respectively.

If the maximum stall time has been exceeded, indicating that maybe the end of travel has been reached, the current position is compared with the minimum and maximum door positions to determine if the position is valid, as shown at conditional blocks 154 and 166.

If the position is valid for the FullClose state 57, the door transitions to the Idle state 54, as shown at block 156. At this time, the calibrated close position is set equal to the current position, the semaphore is set free, the currently full closed flag is set and the calibrated close error flag is cleared.

Similarly, if the position is valid for the FullOpen state 58, the door transitions to the Idle state 54, as shown at block 168. The calibrated open position is set equal to the current position, the semaphore is set free, the currently full open flag is set and the calibrated open error flag is cleared.

If the current position is not valid for the FullClose state 57 or the FullOpen state 58, the door transitions to the FaultIdle state 59, the semaphore is set free, and error flags are set, as shown at blocks 158 and 170.

Figure 14:
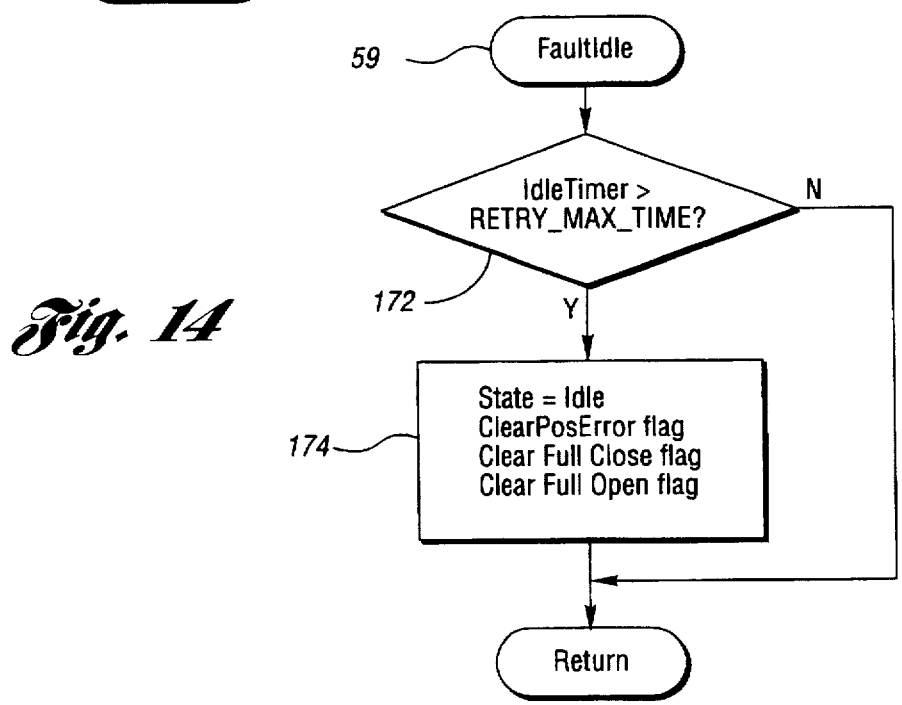

FIG. 14 describes the retry strategy associated with the FaultIdle state 59. If the door has not been in the FaultIdle state 59 for more than a predetermined amount of time, the door continues to remain in the FaultIdle state 59, as shown at conditional block 172. However, if the door has been in the FaultIdle state 59 for more than a predetermined amount of time, RETRY_MAX_TIME, then the door transitions to the Idle state 54 and the flags are cleared, as shown at block 174.

While the best modes for carrying out the invention have been described in detail, those familiar with the art to which this invention relates will recognize various alternative designs and embodiments for practicing the invention as defined by the following claims.

What is claimed is:

1. A method for automatically controlling a heating, ventilating, and air conditioning (HVAC) unit of a vehicle, the HVAC unit having multiple electric motors for actuating multiple respective doors directing air flow through the HVAC unit and temperature of the air flow, the method comprising:

sensing a plurality of temperatures;

determining a desired temperature and desired direction of air flow based on the plurality of temperatures; and controlling the multiple electric motors so that their respective doors move at the same time while preventing preselected doors from operating at the same time, the multiple electric motors controlled based on the desired temperature and desired direction of air flow.

2. The method as recited in claim 1 wherein the multiple doors include at least one subset of doors including mutually exclusive doors that cannot be operated at the same time and wherein the method further comprising:

assigning a flag variable to each of the multiple doors, the same flag variable being assigned to each of the mutually exclusive doors, wherein the flag variable has a locked state and an unlocked state.

3. The method as recited in claim 2 wherein controlling the multiple electric motors comprises:

determining desired doors of the multiple doors to be driven by their respective motors based on the desired temperature and desired direction of air flow;

determining if any of the desired doors include mutually exclusive doors having the same flag variable assigned thereto; and determining if the flag variable assigned to the mutually exclusive doors is in the unlocked state.

4. The method as recited in claim 3 wherein determining if the flag variable is in the unlocked state includes:

setting the flag variable to the locked state;

controlling the respective motor one of the mutually exclusive doors to move the one of the mutually exclusive doors and generating a corresponding feedback signal; and setting the flag variable to the unlocked state after the one of the mutually exclusive doors is no longer moving based on the feedback signal.

5. The method as recited in claim 4 wherein controlling the respective motor includes comparing the feedback signal with a predetermined value.

6. The method as recited in claim 4 further comprising controlling the respective motor of another one of the mutually exclusive doors to move the another one of the mutually exclusive doors and generating a corresponding feedback signal.

7. The method as recited in claim 1 wherein sensing the plurality of temperatures includes sensing a set temperature selected by an occupant of the vehicle.

8. A system for automatically controlling a heating, ventilating, and air conditioning (HVAC) unit of a vehicle, the HVAC unit having multiple electric motors for actuating multiple respective doors directing air flow through the HVAC unit and temperature of the air flow, the system comprising:

a plurality of sensors for sensing a plurality of temperatures; and a controller operative to determine a desired temperature and desired direction of air flow based on the plurality of temperatures and control the multiple electric motors so that their respective doors move at the same time while preventing preselected doors from operating at the same time, the multiple electric motors controlled based on the desired temperature and desired direction of air flow.

9. The system as recited in claim 8 wherein the multiple doors include at least one subset of doors including mutually exclusive doors that cannot be operated at the same time and wherein the controller is further operative to assign a flag variable to each of the multiple doors, the same flag variable being assigned to each of the mutually exclusive doors, wherein the flag variable has a locked state and an unlocked state.

10. The system as recited in claim 9 wherein the controller, in controlling the multiple electric motors, is further operative to determine desired doors of the multiple doors to be driven by their respective motors based on the desired temperature and desired direction of air flow, determine if any of the desired doors include mutually exclusive doors having the same flag variable assigned thereto, and determine if the flag variable assigned to the mutually exclusive doors is in the unlocked state.

11. The system as recited in claim 10 wherein the controller, in determining if the flag variable is in the unlocked state, is further operative to set the flag variable to the locked state, control the respective motor one of the mutually exclusive doors to move the one of the mutually exclusive doors and generate a corresponding feedback signal, and set the flag variable to the unlocked state after the one of the mutually exclusive doors is no longer moving based on the feedback signal.

12. The system as recited in claim 11 wherein the controller, in controlling the respective motor, is further operative to compare the feedback signal with a predetermined value.

13. The system as recited in claim 11 wherein the controller is further operative to control the respective motor of another one of the mutually exclusive doors to move the another one of the mutually exclusive doors and generate a corresponding feedback signal.

14. The system as recited in claim 8 wherein the plurality of sensors includes an in-car temperature sensor for sensing an interior temperature of the vehicle.

15. The system as recited in claim 8 wherein the plurality of sensors includes a sunload sensor for sensing a sunload of the vehicle.

16. The system as recited in claim 8 wherein the plurality of sensors includes an ambient temperature sensor for sensing an ambient temperature outside of the vehicle.

17. The system as recited in claim 8 wherein the plurality of sensors includes a set temperature sensor for sensing a set temperature selected by an occupant of the vehicle.

* * * * *